US009165128B1

(12) United States Patent
Daniel

(10) Patent No.: US 9,165,128 B1
(45) Date of Patent: Oct. 20, 2015

(54) SYSTEM AND METHOD OF SECURING CONTENT FROM PUBLIC DISPLAY ON A MOBILE COMMUNICATION DEVICE

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 37 days.

(21) Appl. No.: 13/891,146

(22) Filed: May 9, 2013

Related U.S. Application Data

(60) Provisional application No. 61/645,490, filed on May 10, 2012.

(51) Int. Cl.
| | | |
|---|---|---|
| *G06F 21/00* | (2013.01) | |
| *G06F 21/31* | (2013.01) | |
| G06F 21/62 | (2013.01) | |
| G06F 21/83 | (2013.01) | |
| G06F 21/53 | (2013.01) | |

(52) U.S. Cl.
CPC .............. *G06F 21/31* (2013.01); *G06F 21/53* (2013.01); *G06F 21/6218* (2013.01); *G06F 21/83* (2013.01); *G06F 2221/2105* (2013.01)

(58) Field of Classification Search
CPC ......... G06F 21/31; G06F 21/83; G06F 21/53; G06F 21/6218; G06F 2221/2105
USPC .......................................................... 726/26
See application file for complete search history.

(56) References Cited

U.S. PATENT DOCUMENTS

| 7,715,560 | B2* | 5/2010 | Lai et al. ...................... 380/252 |
|---|---|---|---|
| 8,438,312 | B2* | 5/2013 | Kapur et al. .................. 709/246 |
| 2007/0067852 | A1* | 3/2007 | James .............................. 726/28 |
| 2008/0229230 | A1* | 9/2008 | Grigoriev et al. ............. 715/780 |
| 2011/0141276 | A1* | 6/2011 | Borghei ........................ 348/143 |
| 2011/0202999 | A1* | 8/2011 | Logan et al. .................... 726/26 |
| 2011/0213652 | A1* | 9/2011 | Gillen et al. ............... 705/14.26 |
| 2012/0032979 | A1* | 2/2012 | Blow et al. .................... 345/647 |
| 2012/0131471 | A1* | 5/2012 | Terlouw et al. ............... 715/741 |
| 2013/0145474 | A1* | 6/2013 | Mergi et al. ..................... 726/26 |
| 2013/0212484 | A1* | 8/2013 | Joshi et al. .................... 715/740 |

* cited by examiner

*Primary Examiner* — Mohammad A Siddiqi
(74) *Attorney, Agent, or Firm* — Carol N. Green Kaul, Esq.

(57) ABSTRACT

The present invention relates generally to a system and method of securing content from public display on mobile communication devices using an application program to categorize, encrypt and hide data providing added security in the event of loss or misuse, wherein the application program is configured for receiving a command to hide at least one content of a data category; storing and hiding the at least one content responsive to the command into a respective data category in a hidden directory by converting the content into concealed data, unavailable for display unless an alternate command is received and the user's identity is authenticated; displaying all content for the data category while excluding the concealed data from the display; and revealing the concealed data when the display area substantially adjacent to a corresponding icon for the data category is engaged on the display screen and the user's identity is verified.

32 Claims, 18 Drawing Sheets

SYSTEM AND METHOD OF SECURING CONTENT FROM PUBLIC DISPLAY ON A MOBILE COMMUNICATION DEVICE

PRIORITY CLAIM

This patent application is a Continuation-in-Part patent application and claims priority under 35 U.S.C. §119(e), to U.S. Provisional Patent Application Ser. No. 61/645,490 titled "A System and Method of Securing Content on a Mobile Communication Device" filed May 10, 2012. The entire disclosure of the afore-mentioned patent application is incorporated by reference as if fully stated herein.

FIELD OF THE INVENTION

The present invention relates generally to a system and method of securing content from public display on mobile communication devices using an application program to categorize, encrypt and hide data providing added security in the event of loss or misuse, wherein the application program is configured for receiving a command to hide at least one content of a data category; storing and hiding the at least one content responsive to the command into a respective data category in a hidden directory by converting the content into concealed data, unavailable for display unless an alternate command is received and the user's identity is authenticated; displaying all content for the data category while excluding the concealed data from the display; and revealing the concealed data when the display area substantially adjacent to a corresponding icon for the data category is engaged on the display screen and the user's identity is verified.

DESCRIPTION OF THE PRIOR ART

Most mobile communication devices, e.g. cellular phones or tablets, have a wealth of information stored thereon, e.g. business contact information, private SMS text messages, confidential phone numbers, pictures, multimedia content and the like. In the event the mobile communication device is lost or stolen, all the stored confidential information is lost and may be misused if the mobile communication device falls into the wrong hands.

Although password protection is a common feature for mobile communication devices, owners do not always use that security feature. This might be due to the fact that password protection for mobile communication devices are often fragile systems, easily compromised allowing unauthorized disclosure of the private and/or confidential information. Thus, there needs to be a system and method of securing the information stored on mobile communication devices such that notwithstanding loss or theft, the information is inaccessible or hidden from unauthorized users.

This invention satisfies these long felt needs in a new and novel manner and solves the foregoing problems that the prior art has been unable to resolve.

SUMMARY

The present invention relates generally to a system and method comprising of a mobile communication device that includes memory means; at least one processor disposed in communication with the memory means; and an application program executable by the at least one processor's computer executable instructions, and configured for performing any one or more of the following: receiving a command to hide at least one content of a data category within a hidden directory; storing and hiding the at least one content within the hidden directory, responsive to the command, into the hidden data category within the hidden directory by converting the at least one content into concealed data, unavailable for display on the displaying means unless an alternate command is received and user's identity is authenticated; displaying all content for the data category while excluding the concealed data for the data category from the display; revealing the concealed data when the display area substantially adjacent to a corresponding icon for the data category is engaged on the display screen and the user's identity is verified; encrypting any one or more of the following: at least one content or the data category; and/or receiving editing commands within the hidden directory to effectuate edits to the concealed data or the hidden data category.

In one embodiment of the invention, system and method comprises of a mobile communication device that includes memory means; at least one processor disposed in communication with the memory means; and an application program, stored in the memory means executable by the at least one processor's computer executable instructions, and configured for performing any one or more of the following: receiving a command to hide a data category from the display; storing and hiding the data category within a hidden directory, responsive to the command, by converting the data category into a hidden data category, unavailable for display on the displaying means unless an alternate command is received and user's identity is authenticated; displaying a plurality of data categories while excluding the hidden data category from the display; revealing the hidden data category when the display area is engaged on the display screen and the user's identity is verified; encrypting any one or more of the following: at least one content or the data category receiving editing commands within the hidden directory to effectuate edits to the concealed data or the hidden data category; and/or restoring the hidden data category from the hidden directory by reconverting the hidden data category to the displayable data category making it available for display.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
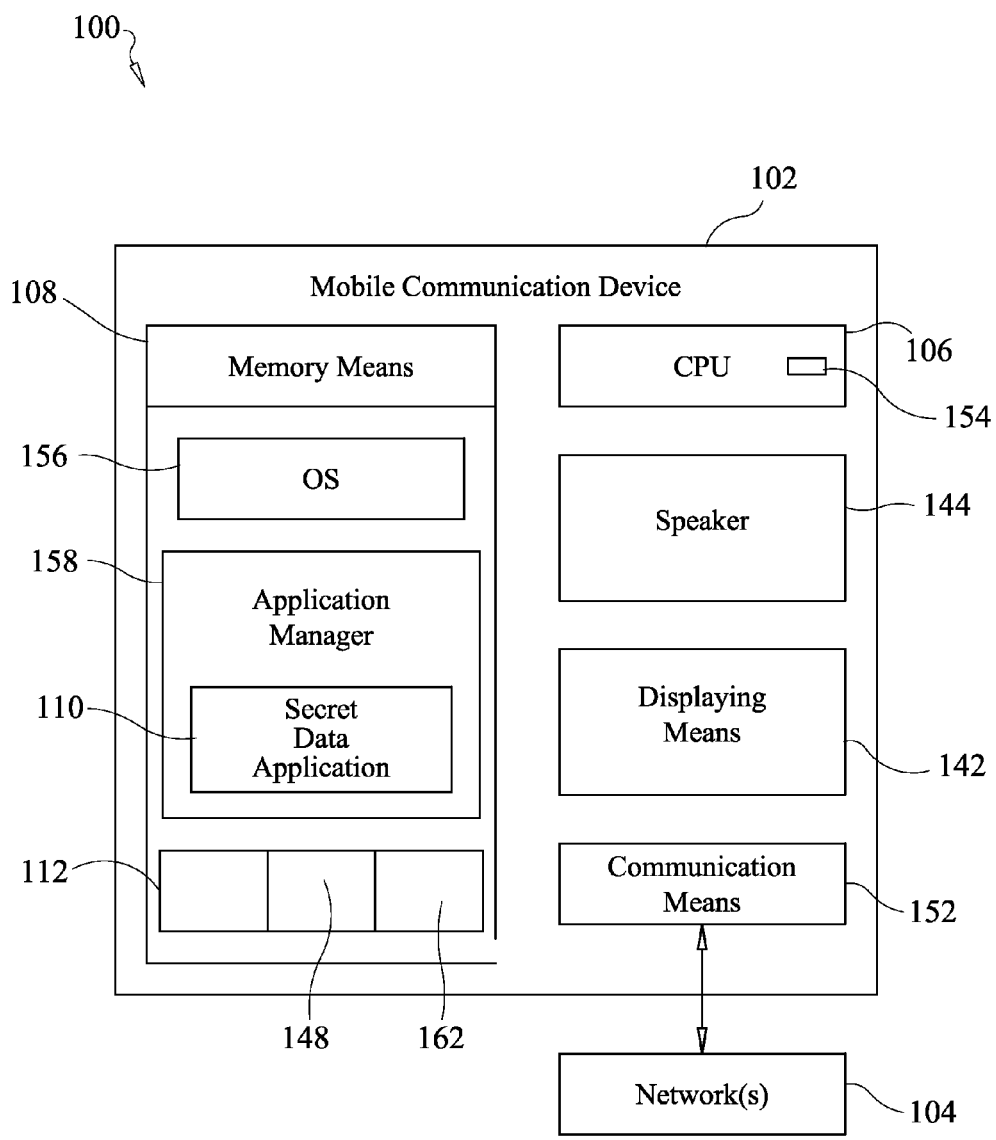
FIG. 1 is an exemplary embodiment of the system according to one embodiment of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

FIG. 1 is an exemplary system 100 of the invention according to one embodiment of the invention. System 100 includes an exemplary mobile communication device 102 whereby mobile communication device 102 may be any type of electronic computing device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network 104.

Mobile communication device 102 may include various hardware components, e.g. a computer central processor 106 and memory means 108. Computer central processor 106 may be any type of processor, such as, but not limited to, a central processing unit (CPU), a microprocessor, a video processor, a front end processor, a coprocessor, a single-core central processor, a multi-core processor, and the like. Central processor 106 may be programmed to activate a secret data application ("app") 110 for cataloguing, encrypting and hiding at least one content 112 of a data category 114 (i.e. folders 116, 116', documents 118, 118', pictures 120, 120', SMS text messages 122, 122', contact listings 124, 124', other third party applications 110', 110", emails 126, 126', calendar entries 128, 128', notes 130, 130', multimedia content 112 (e.g. videos 132, 132', music downloads 134, 134', games 136, 136'), downloaded data 138, 138', call logs 140, 140' or any other storable content 112 and the like) or the data category 114 itself, securing the privacy of the content 112 stored and viewable on the mobile communications device 102. Processor 106 may also be programmed to receive or prompt the user with instructions which may be displayed on the displaying means 142. In some embodiments, mobile communication device 102 also includes a speaker 144 as are well known and used in the arts for broadcasting the various functions being performed, e.g. for the vision impaired.

Mobile communication device's memory means 108 is either electrically or mechanically connected to its at least one computer processor 106. In the case of electronic connections, the electronic connections may be wired and/or wireless connections. Memory means 108 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 108 may be used to store content 112, including but not limited to at least one content 112 of a data category 114, data categories 114, 114', concealed data 146, hidden data category 148, user authentication information 150 and the like. Information stored thereon may be retrieved from memory means 108 using the computer processor 106.

Mobile communication device 102 is also equipped with communication means 152 either electrically or mechanically connected to processor 106. In the case of electronic connections, the electronic connections may be wired and/or wireless. In some embodiments, communication means 152 may be a wireless communication means 152, which employ short range wireless protocol, such as, but not limited to, a radio frequency transceiver, a radio frequency receiver, and/or a radio frequency transmitter. In embodiments where the wireless communication means 152 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 152 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 152 are operative to transmit or receive electronic communications, i.e. content 112, e.g. SMS text messages 122, 122', pictures 120, 120', documents 118, 118', multimedia content 112 and the like, via a short range wireless protocol, such as, but not limited to, a radio frequency receiver, a radio frequency transmitter, or a radio frequency transceiver.

Mobile communication device 102 may include any kind of displaying means 142, such as, but not limited to: a liquid crystal display ("LCD") screen, a light emitting diode ("LED") display, touchpad or touch screen display, and/or any other means known in the arts for emitting a visually perceptible output. Mobile communication device's processor 106 is in electronic communication with its displaying means 142. In other embodiments, displaying means 142 is wirelessly connected to processor 106. Displaying means 142 may include a control means, such as, but not limited to, a touch screen, a stylus, and the like. In some embodiments, display means may be electronically connected to the mobile communication 102 according to the hardware and software protocols that are well known and used in the arts. Processor 106 controls the mobile communication device's displaying means 142, which is configured for displaying at least one or more content 112 located in a data category 114, and the like.

Computer processor 106, positioned within the mobile communication device 102, includes computer executable instructions 154, where the computer executable instructions 154 are operative to perform all the necessary functions for the system 100 and methods disclosed herein, including but not limited to launching the secret data app 110. Computer executable instructions 154 may be loaded directly on the mobile communication device's processor 106, or may be stored in mobile communication device's memory means 108, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 154 may be any type of computer executable instructions 154, which may be in the form of a computer program, the program being composed in any suitable programming language or source code, such as C++, C, JAVA, JavaScript, HTML, XML, and other programming languages. Computer executable instructions 154 are operative to perform any and all the necessary functions for the system 100 and methods disclosed herein which may include launching the application program 110 on the at least one mobile communication device 102.

Mobile communication device 102 also includes software components that may be stored in the memory means 108. Memory means 108 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile communication device 102. Mobile communication device 102 may also contain an input element for inputting data and an output element for displaying data.

Also stored on the memory means 108 may be an operating system 156, application manager 158, and the secret data app 110. Secret data app 110 may be an independent component or may be incorporated into the operating system 156. Secret data app 110 is a computer-executable component readable and executable by the computer processor 106 and configured for performing any one or more of the following: receiving an input command 160 to hide at least one content 112 of a data category 114 within a hidden directory 162, wherein the input command 160 may comprise of clicking an icon 164', touch, or applying pressure on a touch-screen display, audio or text commands 160, 160' and the like; storing and hiding the at least one content 112 in the respective hidden data category 148 within the hidden directory 162 responsive to the command 160, by converting the at least one content 112 into concealed data 146, unavailable for display on the displaying means 142 unless an alternate command 160' is received and user's identity authentication information 150 is verified. An alternate command 160' may include a counter command for hiding the at least one content 112, e.g. "Show" or "Display" provided in text, audio or using a drop down menu on the mobile device's display 166.

Secret data app 110 is also configured for displaying all content 112 for the respective data category 114, where such content 112 includes all other content 112 with the exception of the at least one content 112 that was converted to concealed data 146. As such, secret data app 110 is configured for displaying all content 112 for the respective data category 114, while excluding the concealed data 146 for the respective data category 114 from the display 166. Secret data app 110 is also configured for revealing the presence of concealed data 146 when the display area 168 substantially adjacent to a corresponding icon 164 for the data category 114 is engaged on the display screen 170 and the user's authentication information 150 is verified by any one or more of the following: login id 172, password 174 or a biometric identifier 174 (not shown), for example finger prints, retina scan, etc., to the extent the mobile communication device 102 supports biometric verification technology.

Application manager 158 comprises of computer-executable components that operate in mobile communication device 102 and may be implemented in a variety of ways. In one embodiment of the invention, application manager 158 may use one or more computer-executable components for interacting with the secret data app 110. In another embodiment, secret data app 110 is incorporated in application manager 158 to receive information from the input element, to communicate with, and/or to control the operations of secret data app 110.

Secret data app 110 may comprise in part of a browser, such as for use on the mobile communication device 102, or a similar browsing device. Secret data app 110 may be any type of software application, such as a standalone application designed to run on a mobile platform, such as a mobile communication device running an operating system 156, such as iOS™, Android™, Windows Mobile™, Blackberry™, and the like. Secret data app 110 may be operative for an iPhone, any other "smart phone", mobile communication device, cellular phone, PDA, GPS or any other mobile communication device 102 capable of handling transactions dealing with dynamic content, object, application, or software. In another embodiment, the app 110 may be designed to run on a social network platform, such as FACEBOOK™ or JUSTSYNC™. In some embodiments, secret data app 110 may reside on a server and/or on a mobile communication device 102, where the server computer 176 may have a software program residing in memory. An exemplary client device 102' may have the secret data app 110 residing in local memory or the secret data app 110 and maybe downloadable to the client device 102' from the server. For example, in one embodiment, the secret data app 110 may be on a mobile communication device 102 (such as an iPhone, Blackberry, or other 'smart phone') and the full-sized software program may be on a server computer 176, where communications may occur over a network or directly, either wired or wirelessly. Computer 176 includes but is not limited to a network enabled computer, a laptop or personal digital assistant subject to wired/wireless connectivity, which is configured with a computer processor 106.

In either embodiment, computer executable instructions 154 readable by computer processor 106, (i.e. the server's computer processor 106' or the mobile communication device's processor 106) are operative to launch the secret data app 110 for securing at least one content 112 and/or a data category 114 on a mobile communication device 102. The systems 100 and methods implemented herein provide for the mobile communications device's display 166 to keep selected content 112 and/or a data category 114 to be excluded from the display 166, such that without user authentication, a non-authorized user will have no inkling that the selected content 112 and/or a data categories 114, 114 do exist.

In some embodiments, mobile communication device 102 may have one or more icon 164, 164' as are well known and used in the arts or other visual indicators displayed thereon that allows user to launch and access the secret data app 110 associated with its icon 164. When a user selects the icon 164 for the secret data app 110 (e.g., by touching a touchscreen, or selecting it using a pointing device, roller ball, arrow keys, or other controller), the computer central processor's computer executable instructions 154 launches the secret data app 110. The processor 106, which is electronically connected to the displaying means 142, controls the displaying means 142 to display the secret data app 110 as launched on the at least one mobile communication device's displaying means 142. Once launched on the mobile communications device 102, the secret data app 110 allows content 112 of a data category 114 (i.e. folders 116, 116', documents 118, 118', pictures 120, 120', SMS text messages 122, 122', contact listings 124, 124', other third party applications 110', 110'', emails 126, 126', calendar entries 128, 128', notes 130, 130', multimedia content 112, downloaded data 138, 138', call logs 140, 140' or any other storable content 112 and the like) or the data category 114 itself to be hidden from the display 166 on the mobile communication device's displaying means 142. In some embodiments, the data category 114 is represented by an icon 164 on the display 166.

Figure 2A:
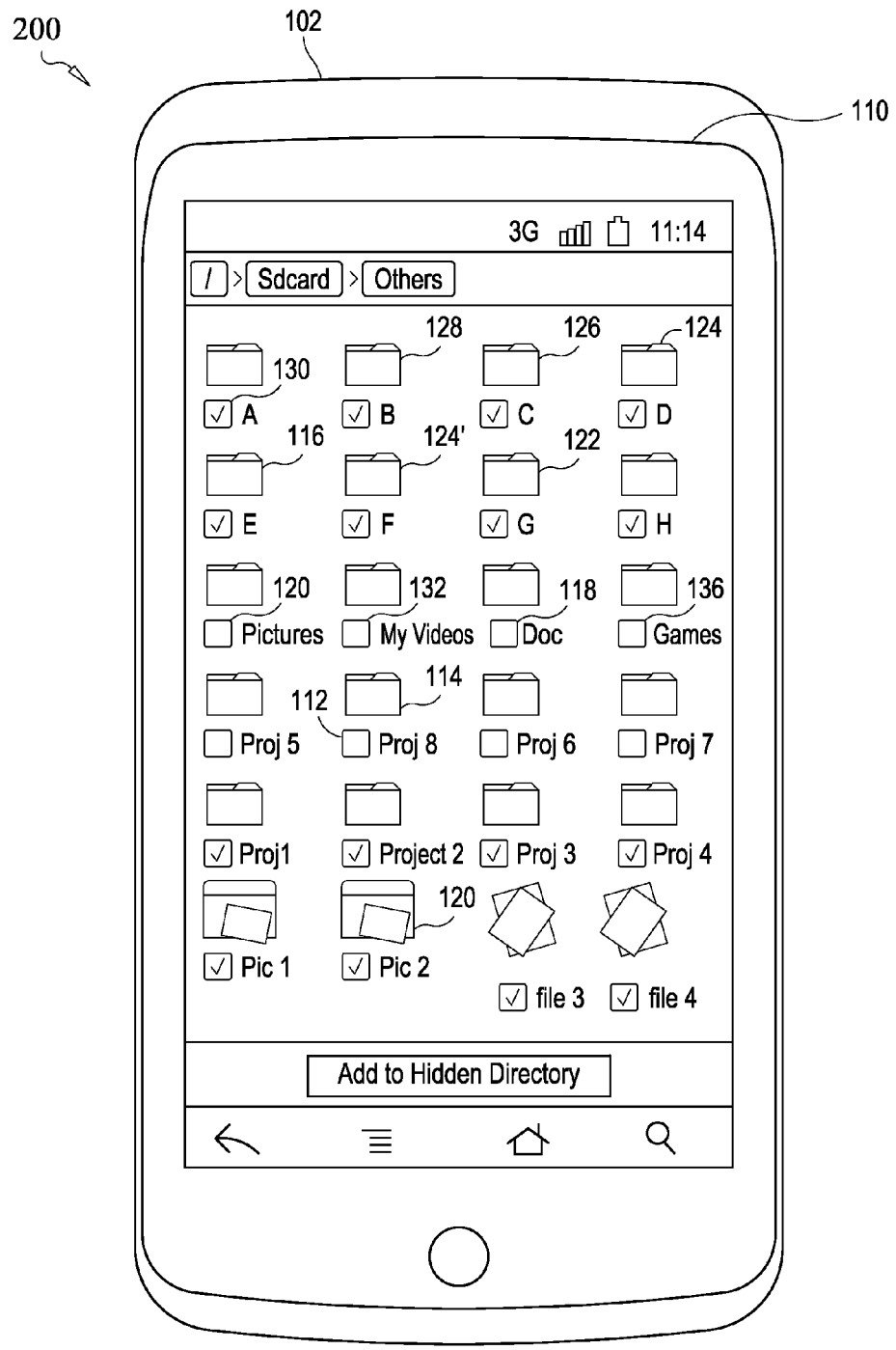
FIGS. 2A-2B are exemplary embodiments of the system of the invention in use according to one embodiment.
Figure 2B:
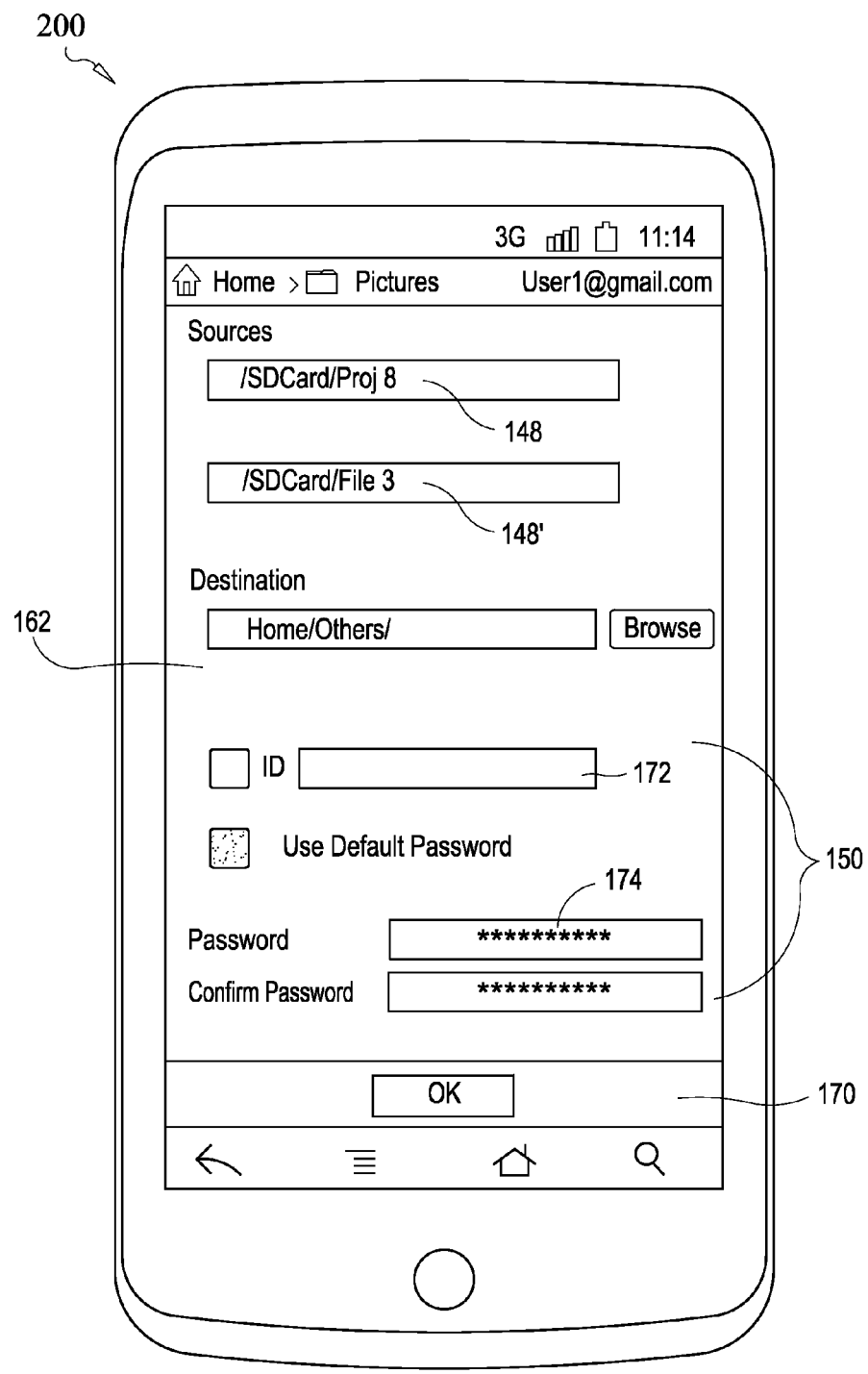

FIGS. 2A-2B are exemplary embodiments of the system 200 of the invention in use according to one embodiment. System 200 comprises of the mobile communication device 102, which includes memory means 108 positioned within, at least one processor 106 disposed in communication with the memory means 108; and the secret data app 110, stored in the memory means 108, readable and executable by the at least one processor's computer executable instructions 154. Secret data app 110 is configured for performing any one or more of the following: receiving an input command 160 to hide at least one content 112 of a data category 114 within a hidden directory 162 wherein the input command 160 may comprise of clicking an icon 164', touch, or applying pressure on a touch screen display, audio or text commands 160, 160' and the like. As shown, by tapping the display screen 170, a drop down menu 302 (as shown on FIG. 3) is displayed, wherein user may select the input command 160 to hide at least one content 112 of a data category 114 to a hidden directory 162. Secret data app 110 is configured for storing and hiding the at least one content 112 in the respective hidden data category 148 within the hidden directory 162, responsive to the command 160 by converting the at least one content 112 into concealed data 146, unavailable for display on the displaying means 142 unless an alternate command 160' is received and user's identity authentication information 150 is verified. In some embodiments, the conversion includes adding a flag to the at least one content 112 while stored in temporary or permanent memory means 108, such that the display means 112 recognizes the flag and displays all content 112, 112' for the respective data category 114 while excluding the concealed data 146 for the respective data category 114 from the display 21 that would otherwise have been available for display. Secret data app 110 is configured for revealing the concealed data 146 when the display area 168 substantially adjacent to a corresponding icon 164' for the data category 114 is engaged on the display 166 and the user's authentication information 150 is verified by any one or more of the following: login id 172, password 174 or a biometric identifier 174 (not shown) to the extent the mobile communication device 102 supports biometric verification technology.

Figure 3A:
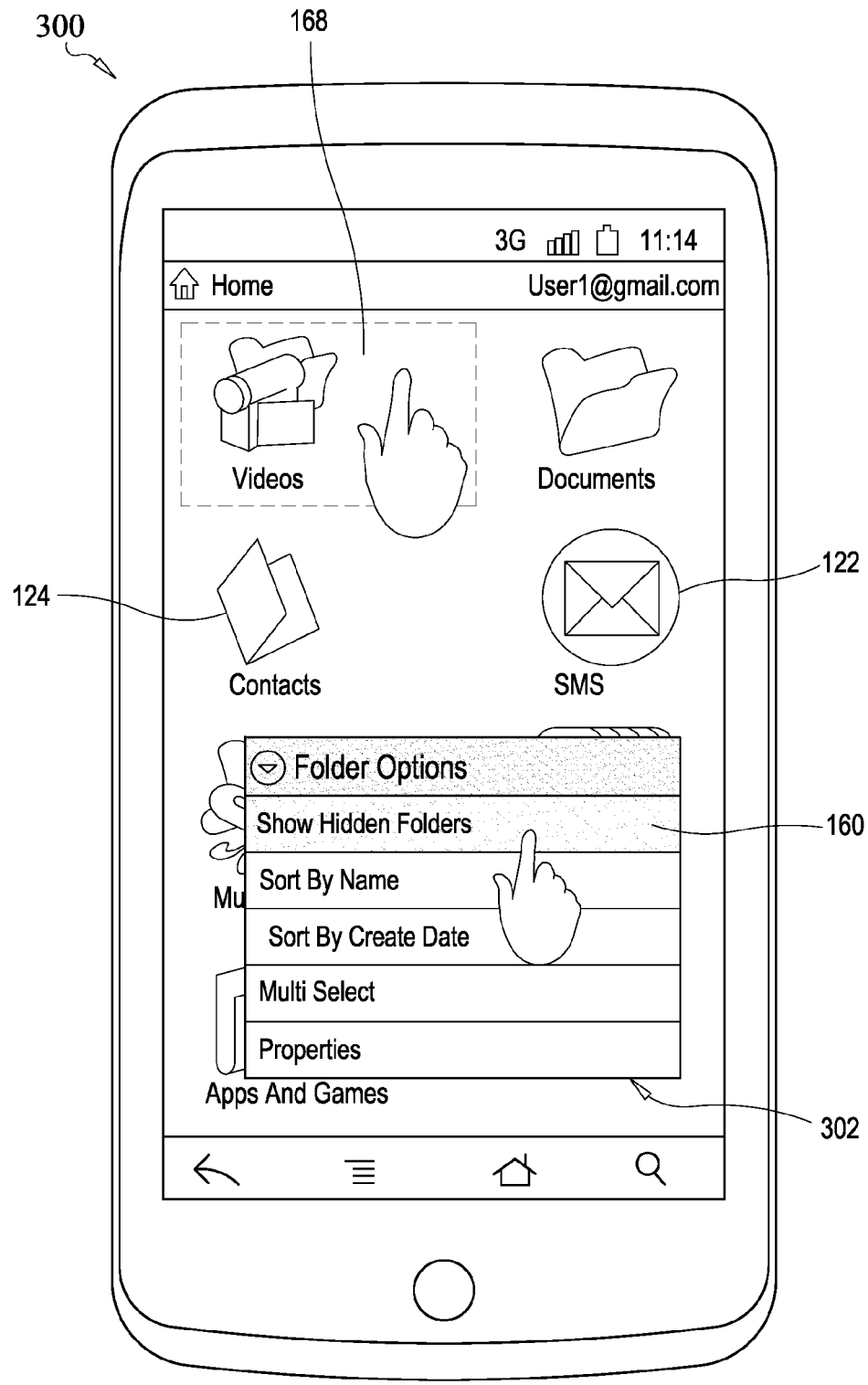
FIGS. 3A-3C are exemplary embodiments of the system of the invention in use according to one embodiment.
Figure 3B:
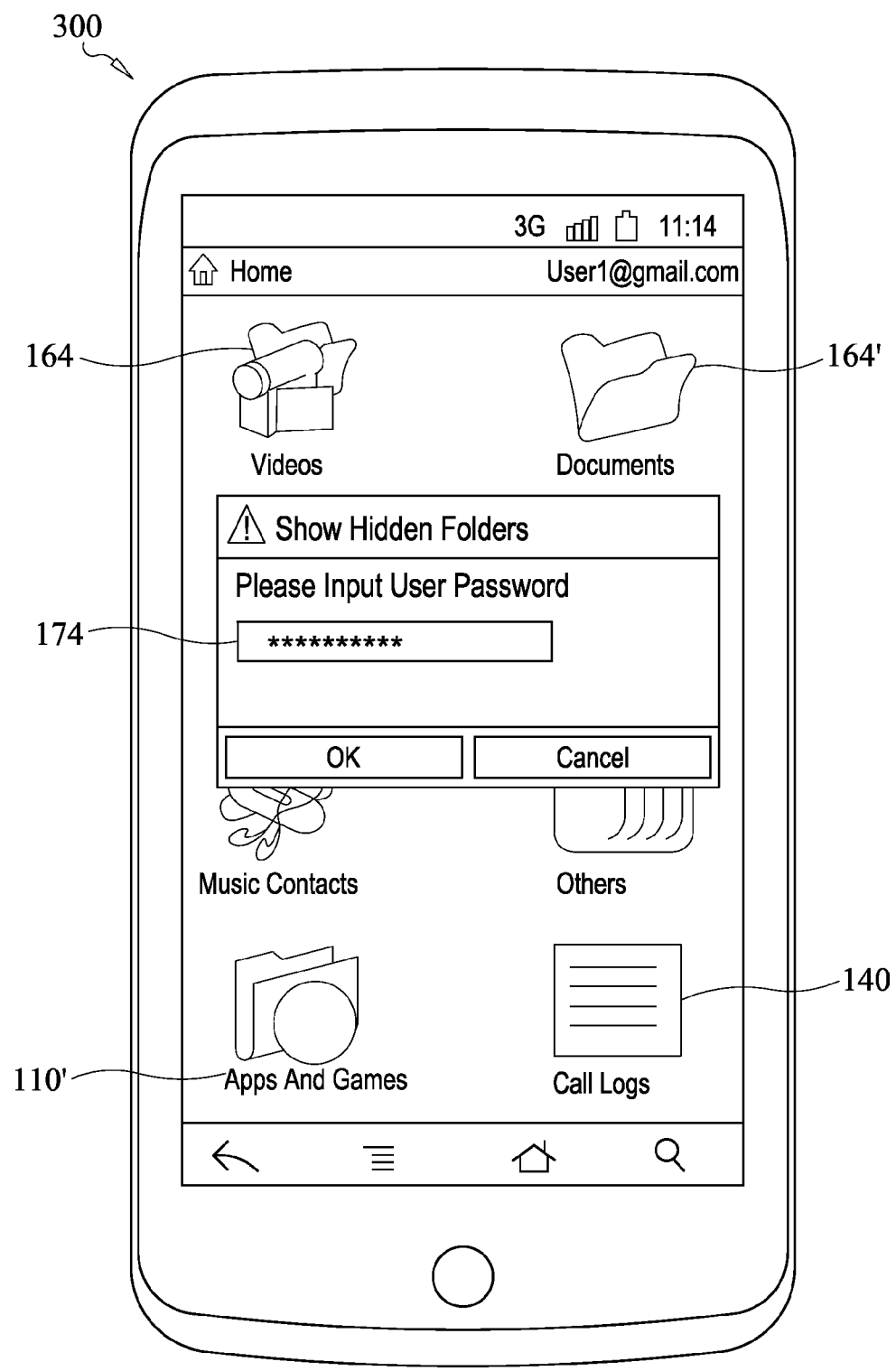
Figure 3C:
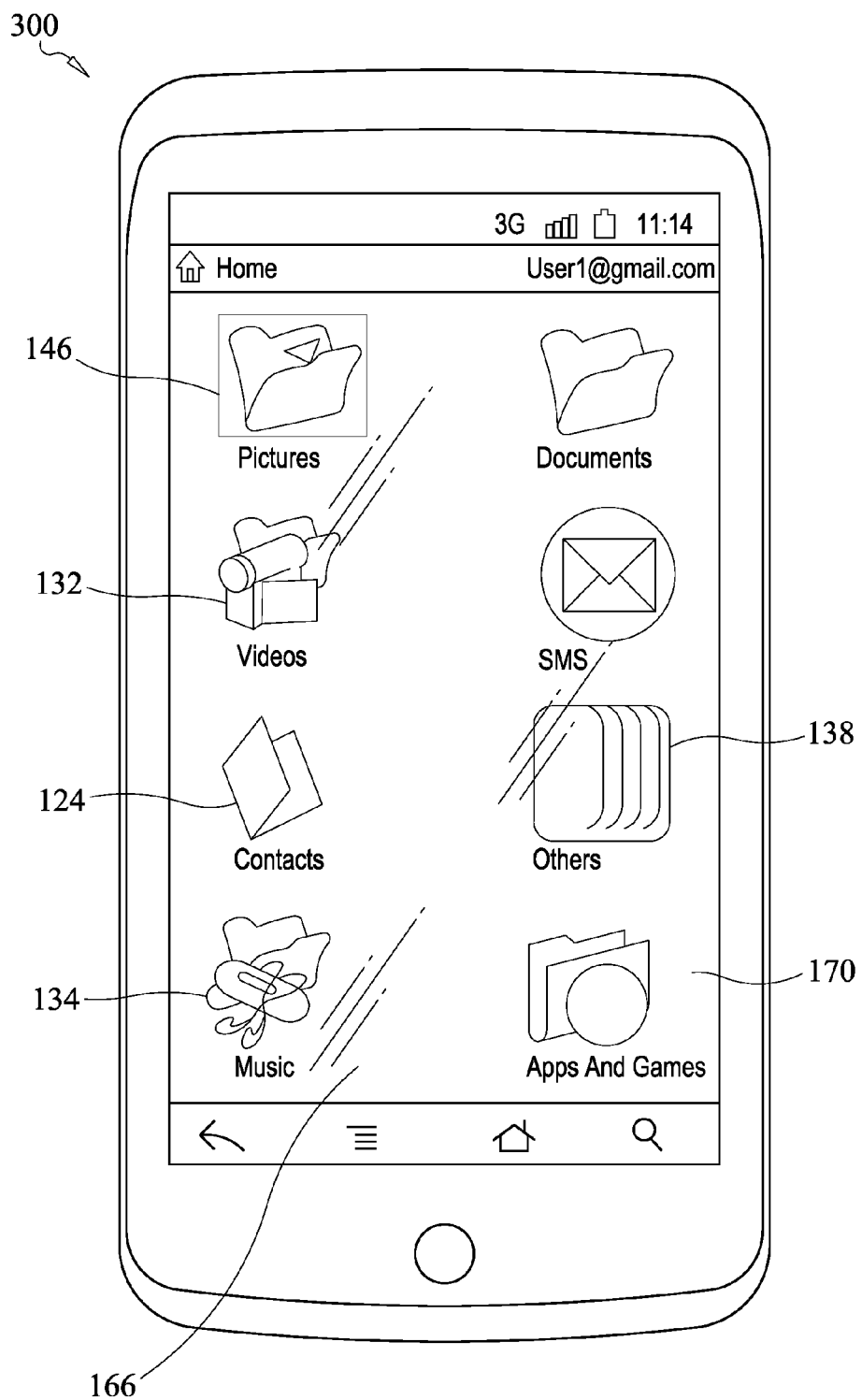

FIGS. 3A-3C are exemplary embodiments of the system 300 of the invention in use according to one embodiment. As previously discussed, once the content 112 or data category 114 is converted to concealed data 146 and hidden data category 148, respectively, an unauthorized user will not have access to the concealed data 146 and hidden data category 148. However, upon valid user authentication, secret data app 110 is configured for restoring the concealed data 146 or the hidden data category 148 from the hidden directory 162 by reconverting the concealed data 146 or the hidden data category 148 to the at least one content 112 or the data category 114, respectively making either available for display.

System 300 includes the secret data app 110 that is configured for authenticating the user as being authorized to receive display of previously concealed data 146 by requiring for instance the user's authentication information 150. Once verified as correct as correct secret data app 110 is configured for displaying all data content 112 for the corresponding data category 114 including the concealed data 146 on the mobile communication device's displaying means 142.

As shown, the secret data app 110 reveals the concealed data 146 when the display area 168 substantially adjacent to a corresponding icon 164 for the data category 122 is engaged on the display screen 170 and the user's authentication information 150, e.g. password 174 is verified.

Figure 4A:
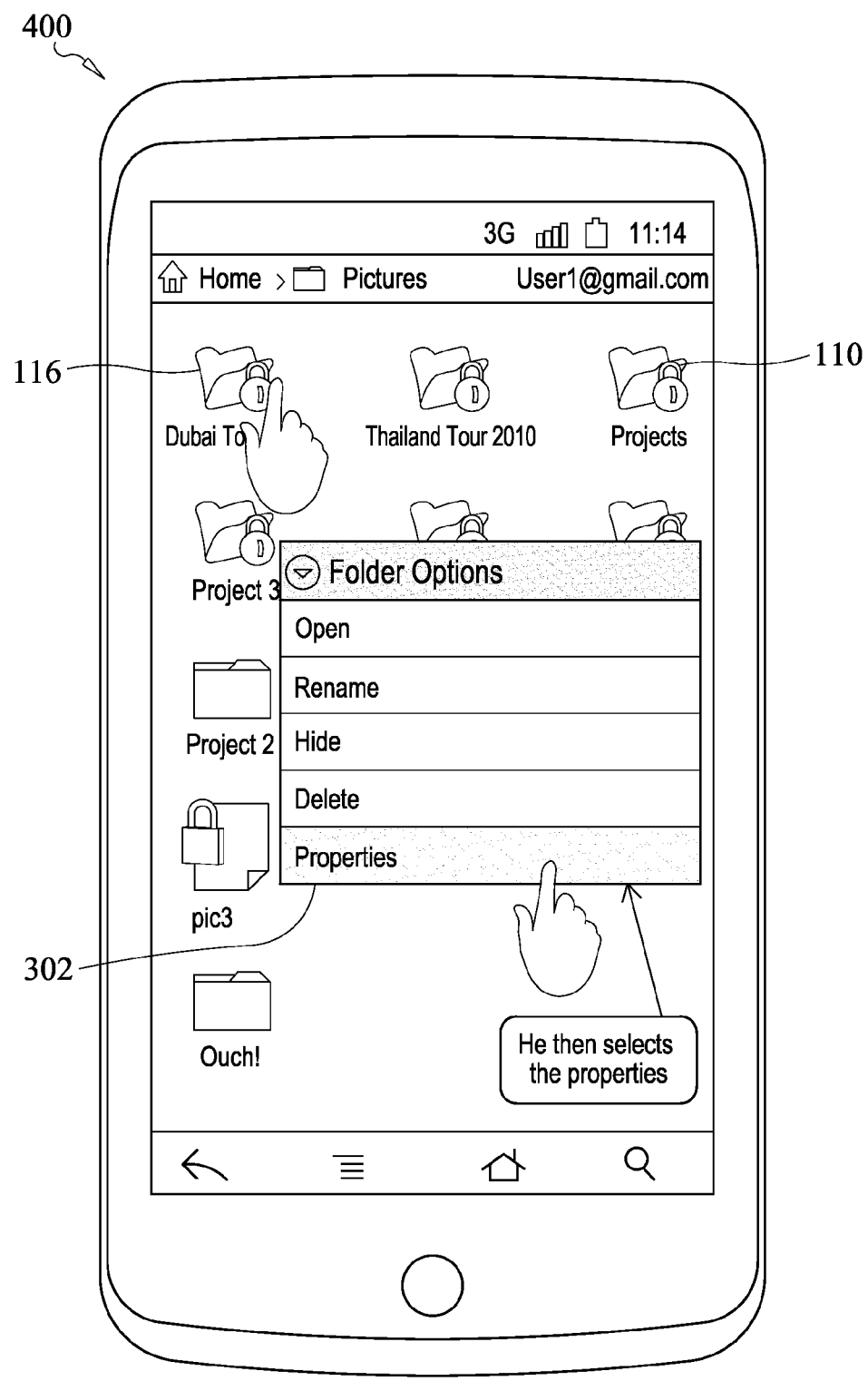
FIGS. 4A-4C are exemplary embodiments of the system of the invention in use according to one embodiment.
Figure 4B:
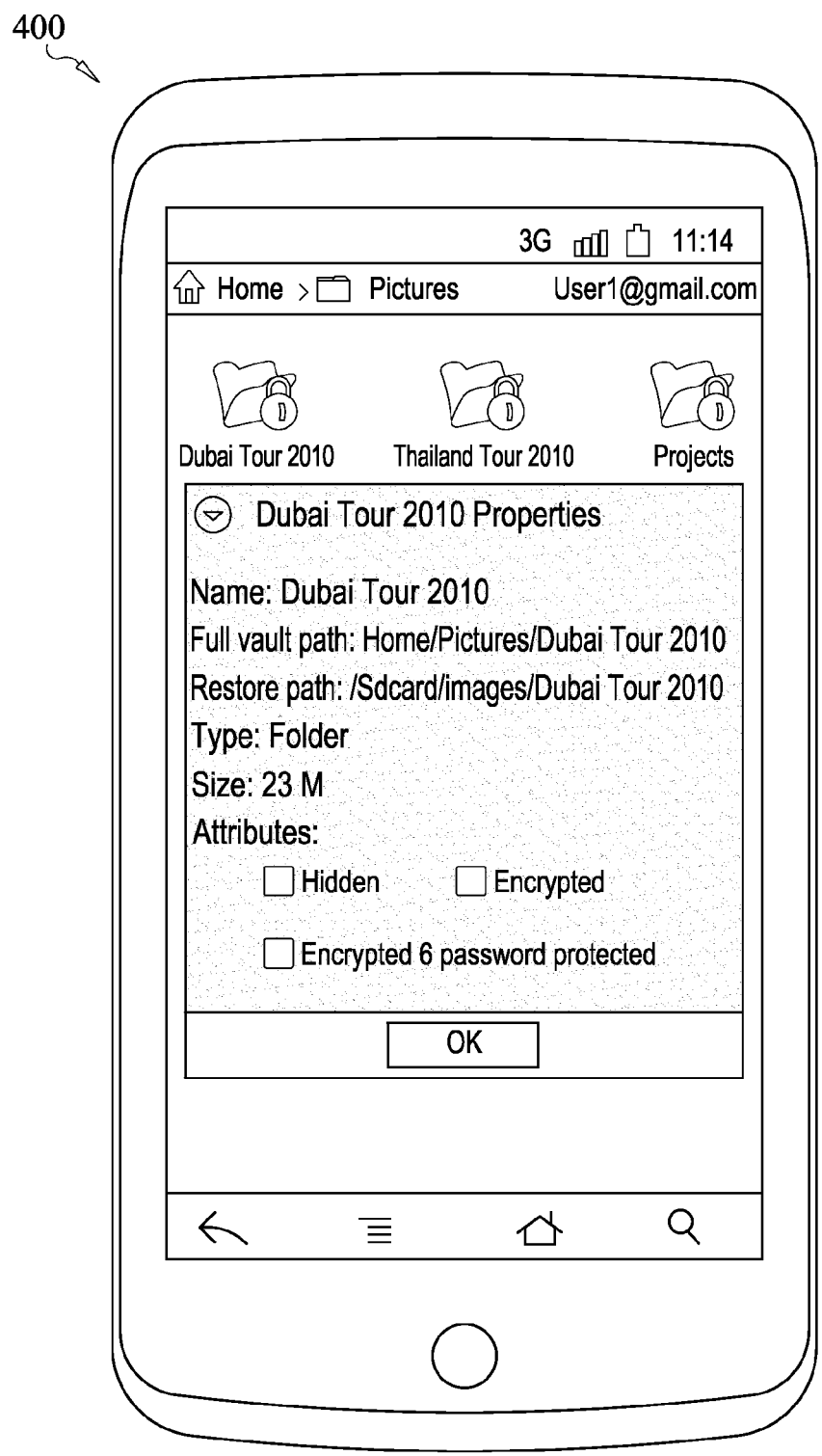
Figure 4C:
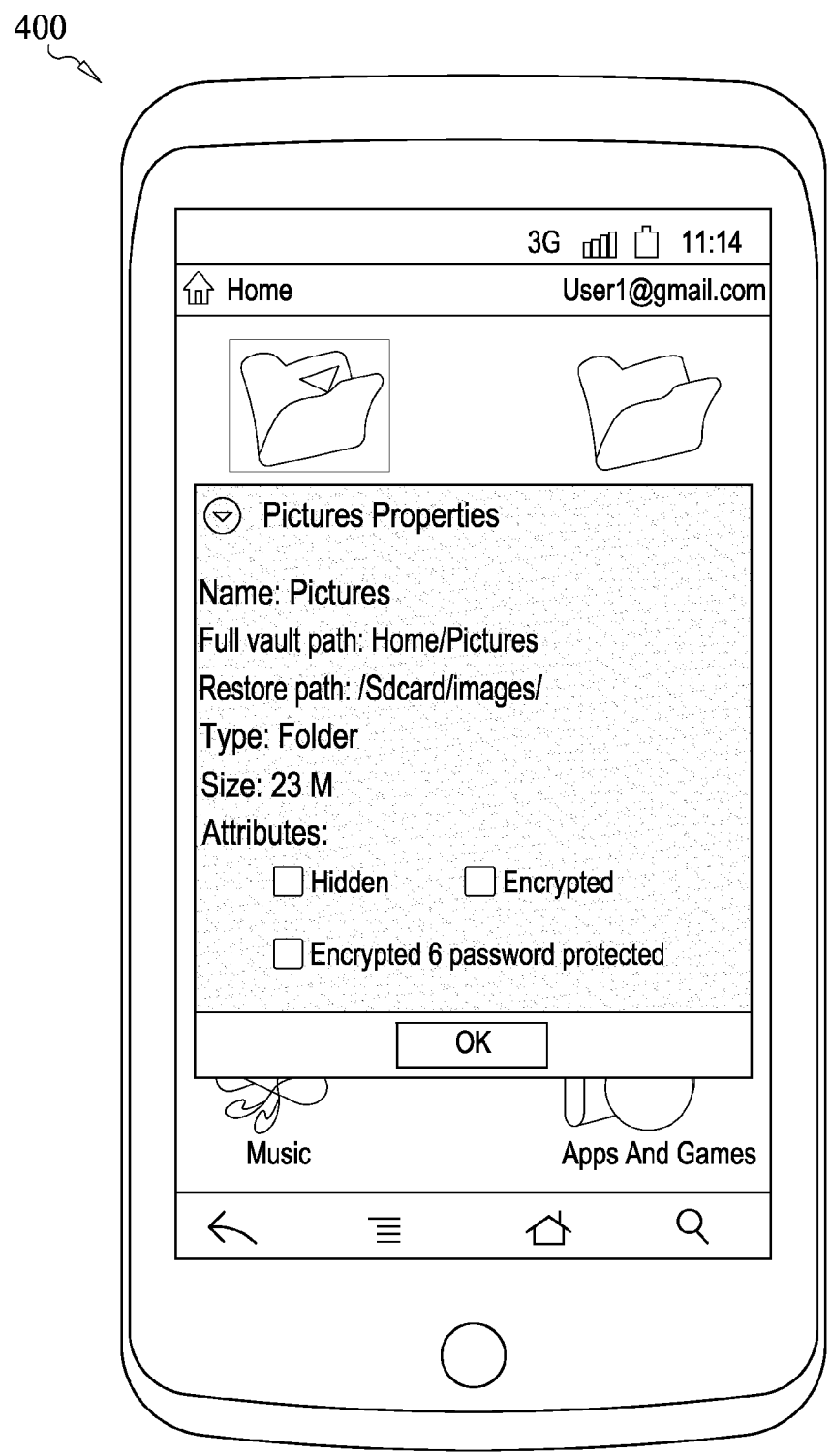

FIG. 4A-4C are exemplary embodiments of the system 400 of the invention in use according to one embodiment. Secret data app 110 is configured for encrypting any one or more of the following: at least one content 112 or the data category 114 as shown in FIG. 4, whereby the at least one content 112 may be encrypted which may require by authenticating the user's authentication information 150 with for instance a login id 172 or password 174 as authorized to issue an encryption command 160 for at least one content 112 or data category 114.

Figure 5A:
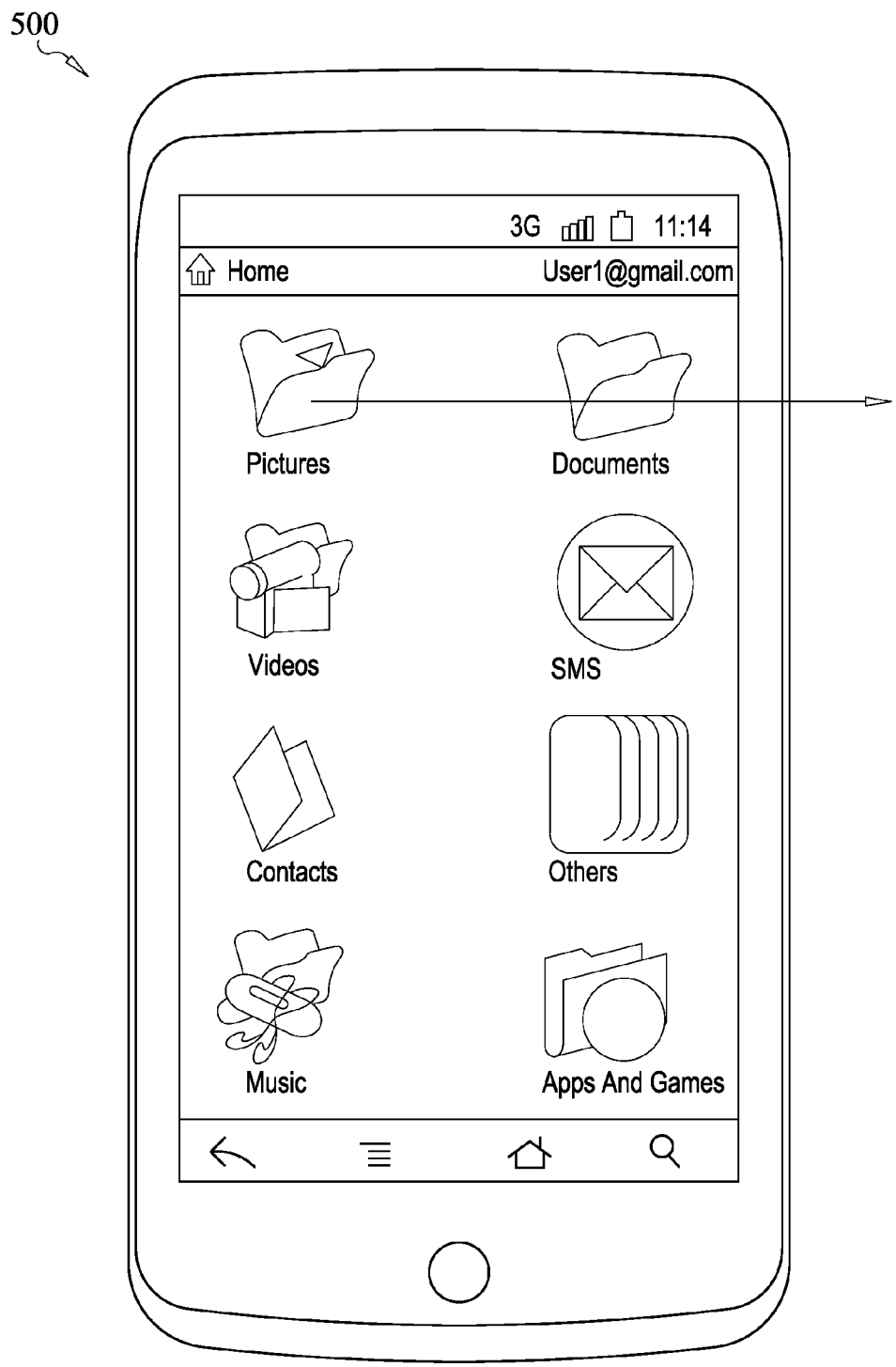
FIGS. 5A-5B are exemplary embodiments of the system of the invention in use according to one embodiment.
Figure 5B:
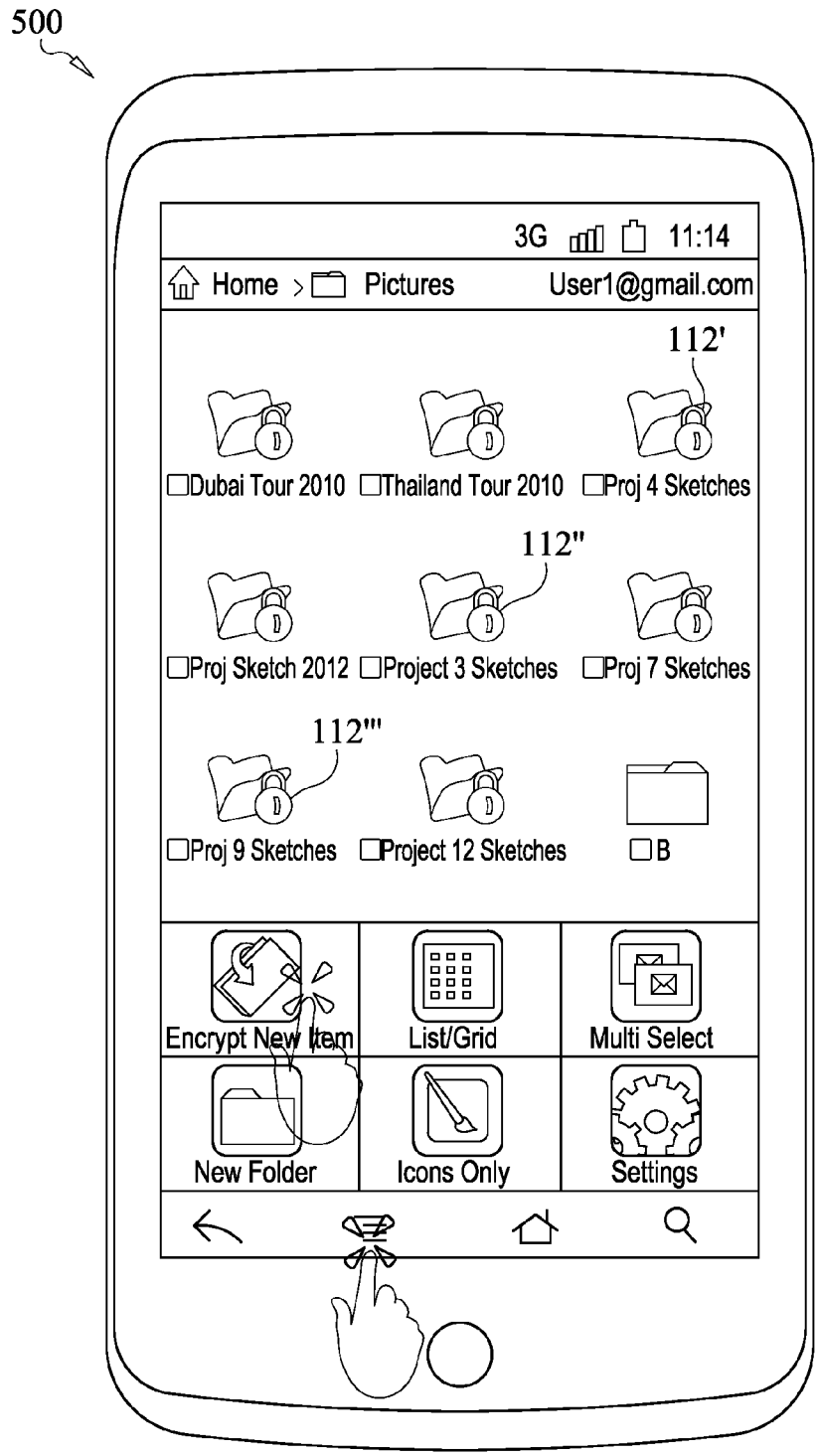

FIGS. 5A-5B are exemplary embodiments of the system 500 of the invention in use according to one embodiment. Secret data app 110 is configured for storing encrypted at least one content 112' with other non-encrypted content 112', 112''' within its respective data category 114. Encrypting the at least one content 112 may be an option that the user exercises as opposed to hiding the at least one content 112 in a hidden data category 148 within the hidden directory 162. Notwithstanding, once the at least one content 112 is encrypted, to view the encrypted the at least one content 112', user will need to supply a valid login id 172 and password 174 so the secret data app 110 can decrypt and display the at least one content 112.

Figure 6A:
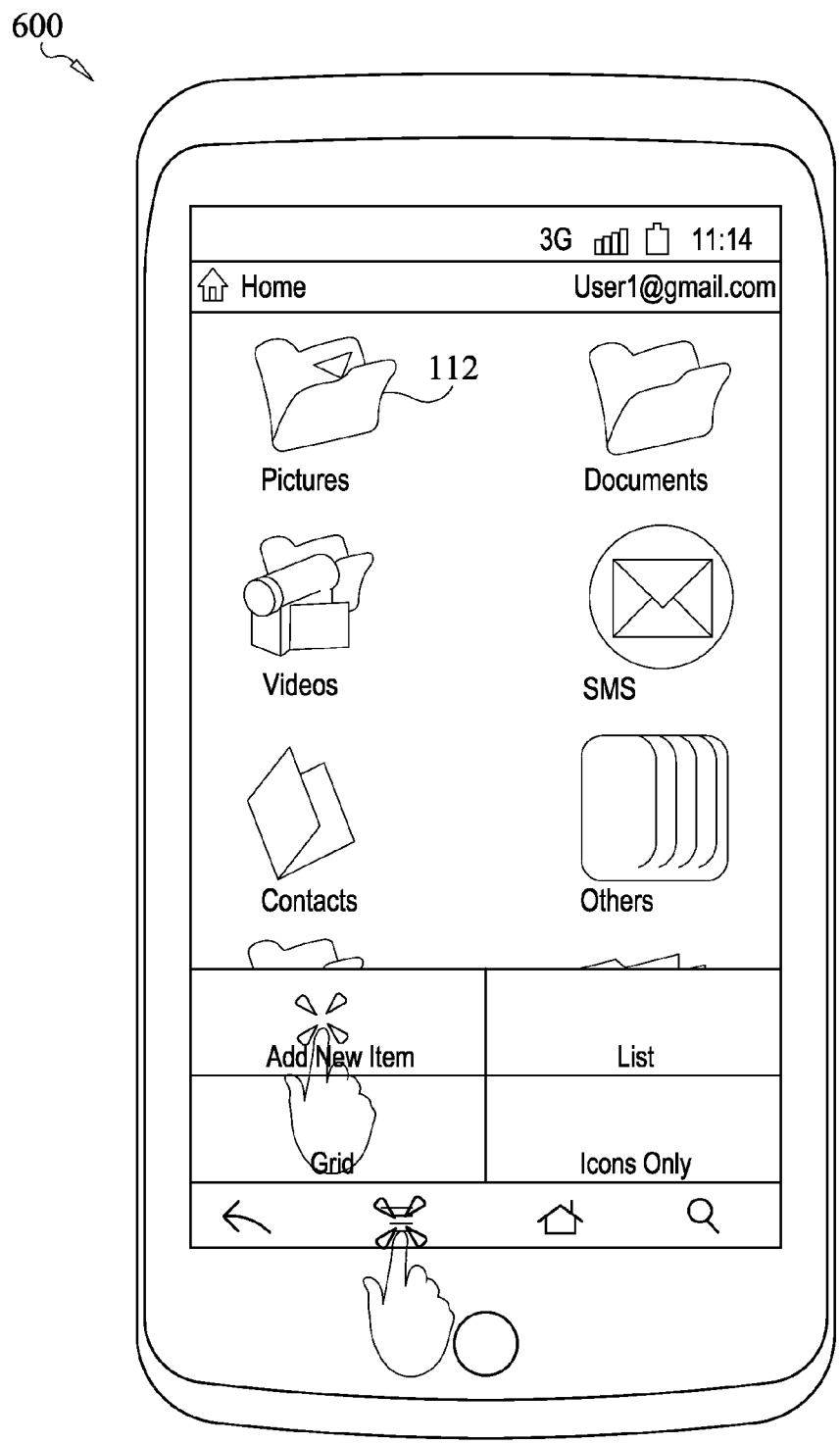
FIGS. 6A-6B are exemplary embodiments of the system of the invention in use according to one embodiment.
Figure 6B:
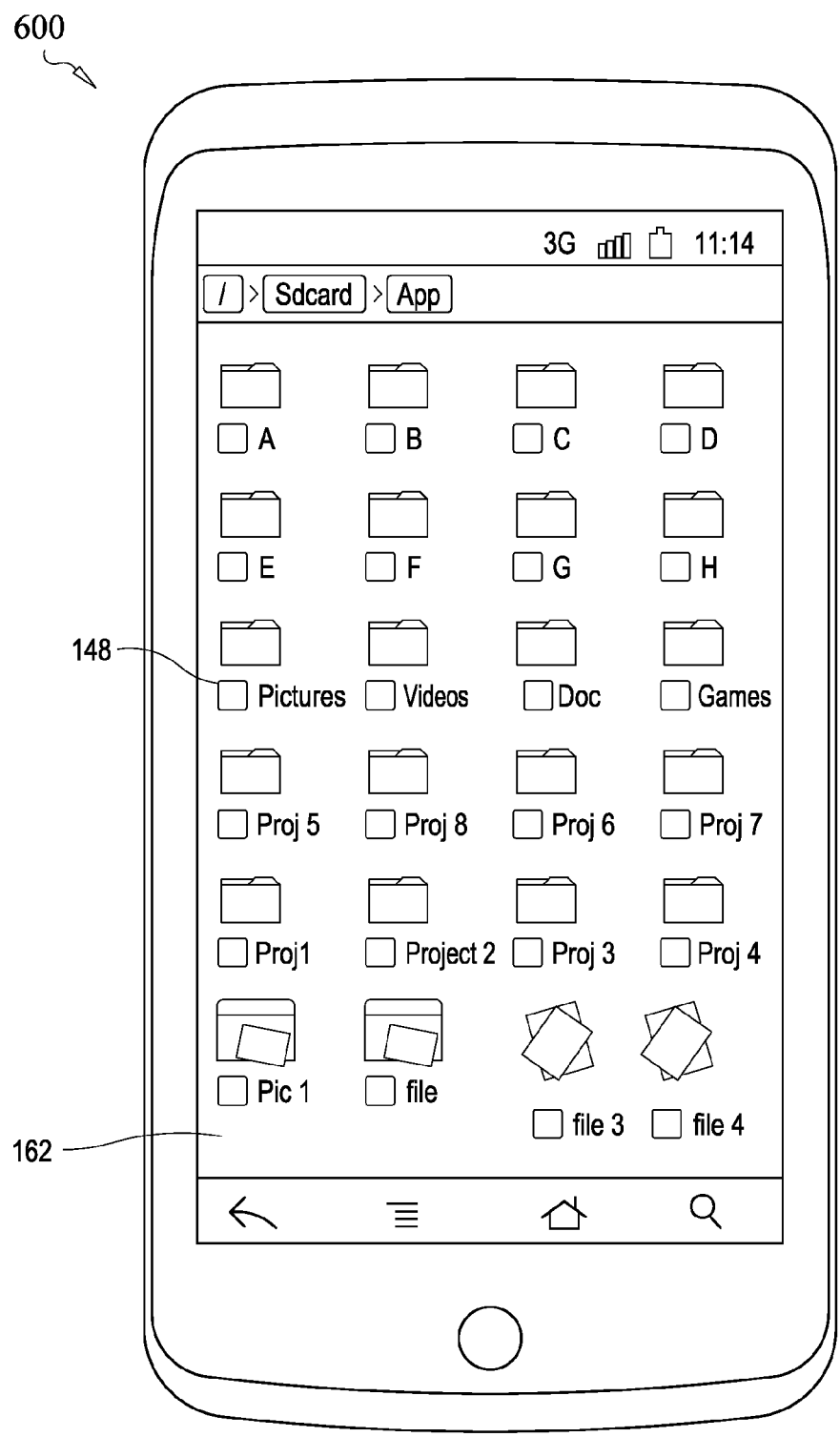

FIGS. 6A-6B are exemplary embodiments of the system 600 of the invention in use according to one embodiment. Secret data app 110 is configured for storing and cataloguing concealed data 146 within a hidden directory 162 in a hidden data category 148 that would otherwise correspond to the at least one content 112 in its viewable state.

Figure 7A:
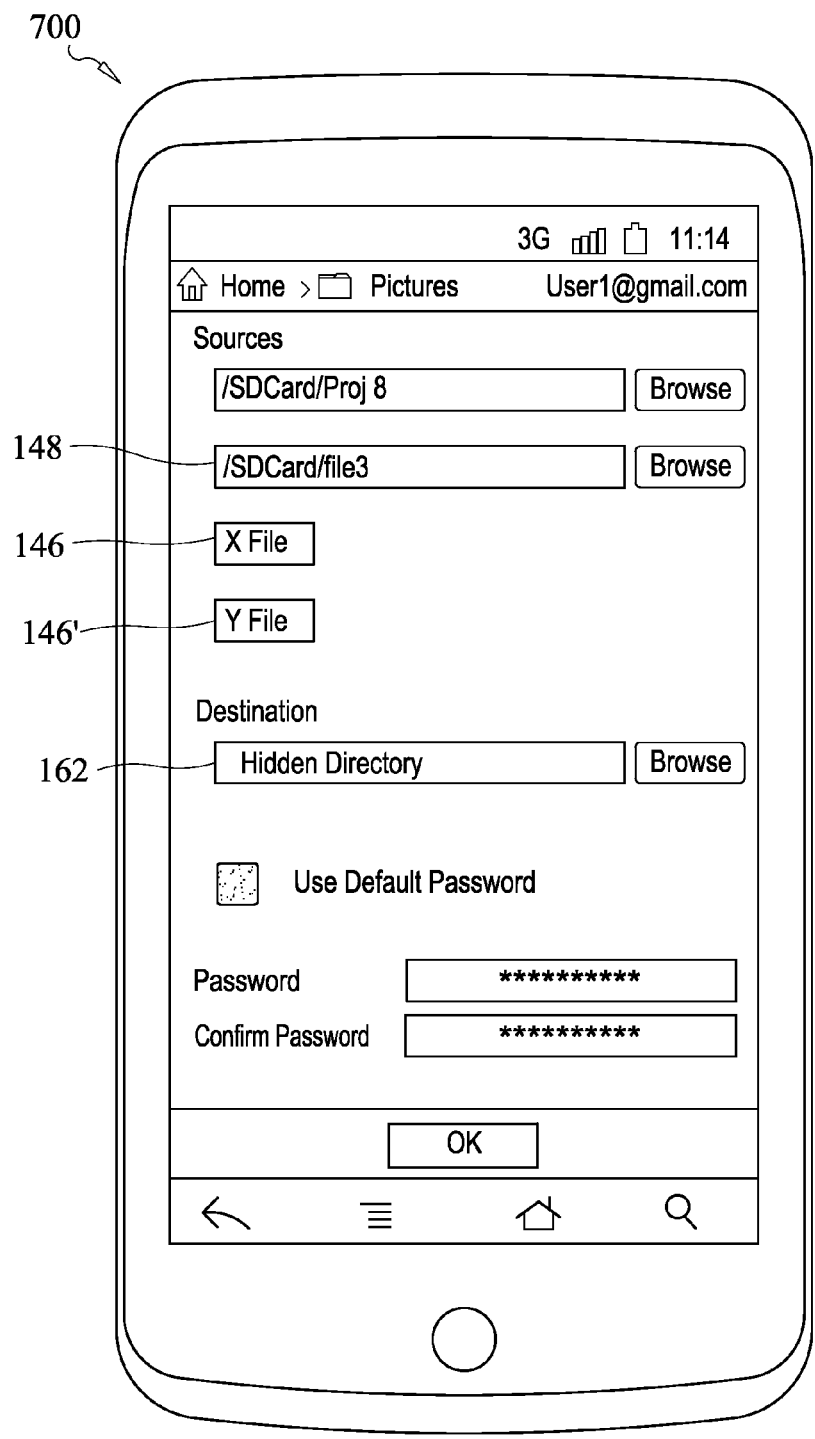
FIGS. 7A-7B are exemplary embodiments of the system of the invention in use according to one embodiment.
Figure 7B:
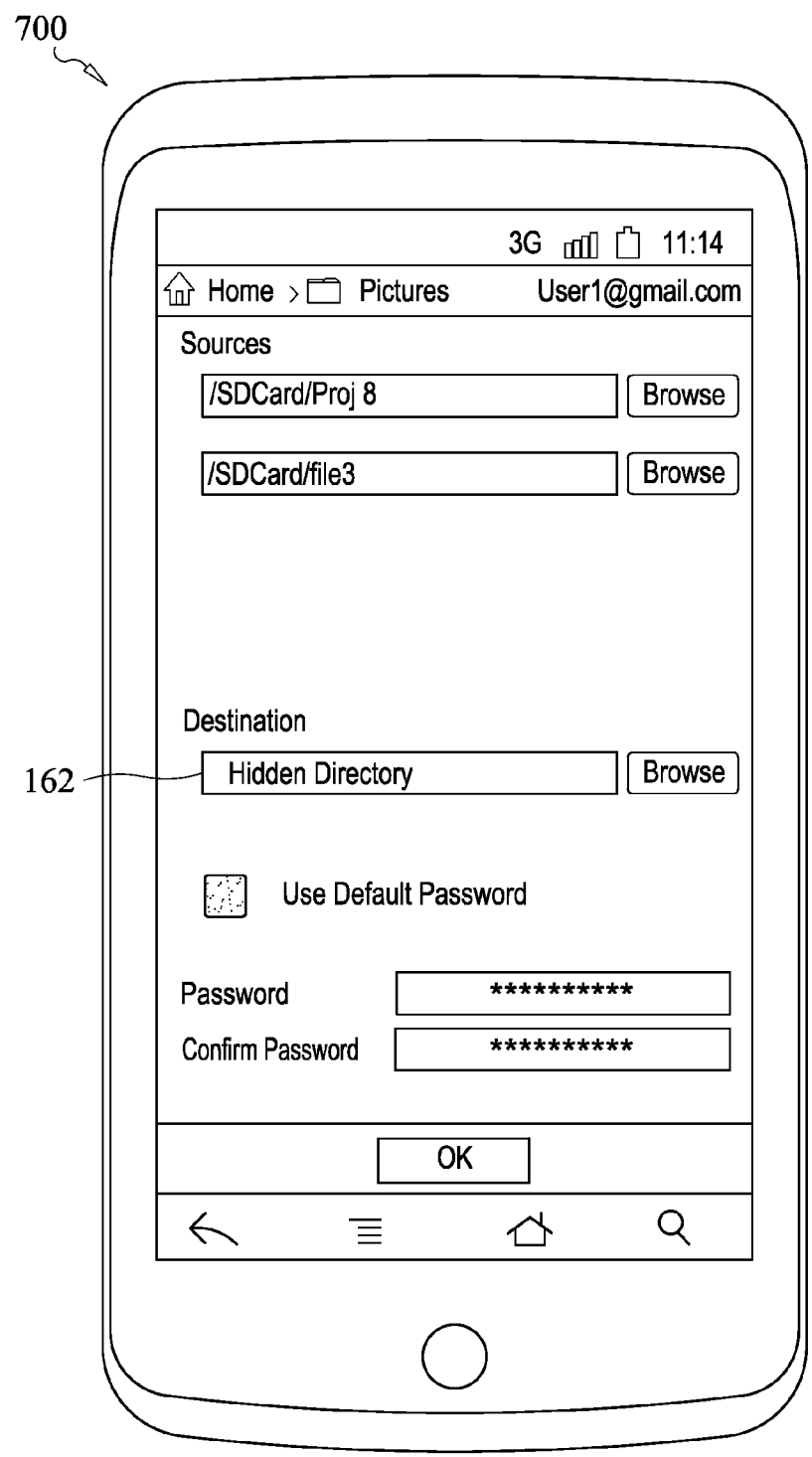

FIGS. 7A-7B are exemplary embodiments of the system 700 of the invention in use according to one embodiment. The concealed data 146 and hidden data category 148 stored in the hidden directory 162 loses none of its editable functions by residing in the hidden directory 162 as secret data app 110 is configured for receiving editing commands 160, 160' within the hidden directory 162 to effectuate edits (save, adding, deleting, copying, moving, play, rewind, pause, fast forward, and the like) to the concealed data 146 and the hidden data category 148.

Methods

Figure 8:
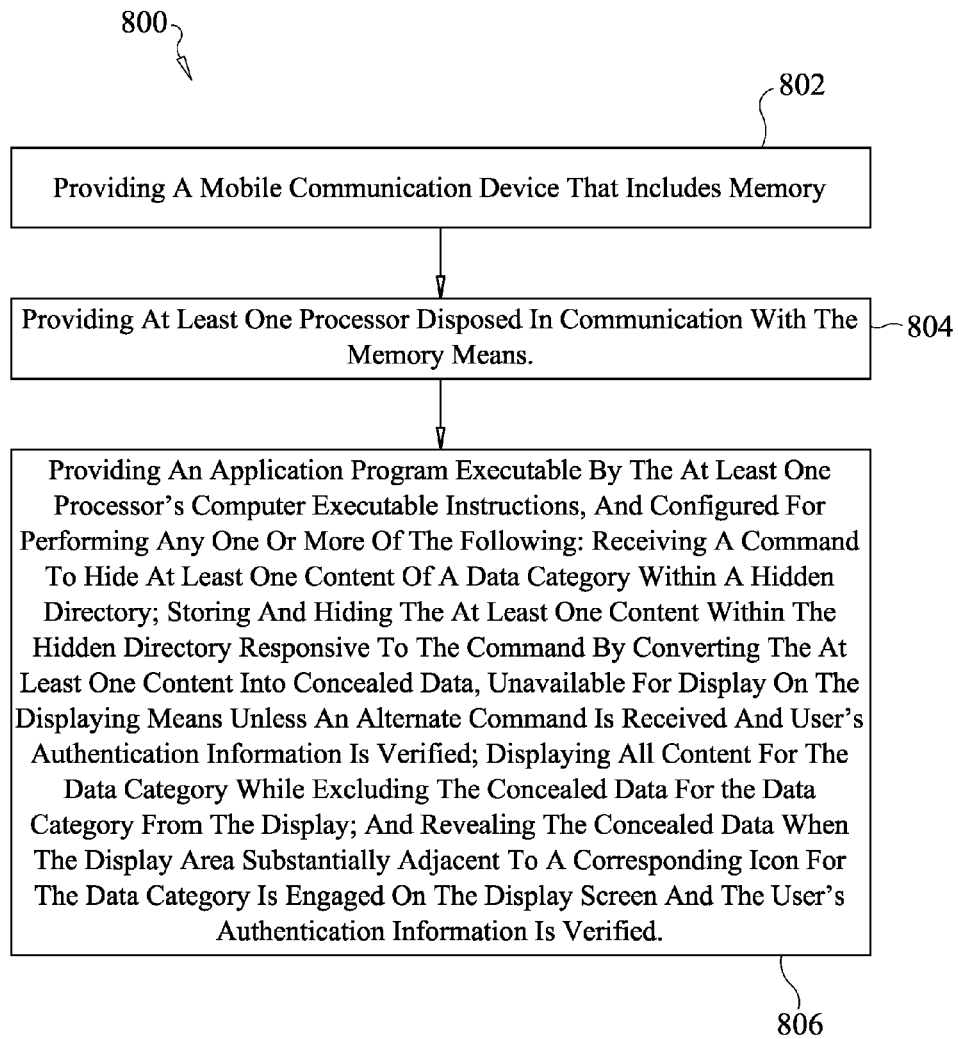
FIG. 8 is exemplary method according to one embodiment of the invention.

FIG. 8 is exemplary method 800 according to one embodiment of the invention. Method 800 comprises of providing a mobile communication device 102 that includes memory means 108 (step 802). Mobile communication device 102 may be any type of electronic computing device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

Memory means 108 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 108 may be used to store content 112, including but not limited to text messages 122, 122', pictures 120, 120', documents 118, 118', multimedia content 112, e.g. videos 132, 132', music downloads 134 and the like. Information stored thereon may be retrieved from memory means 108 using the computer processor 106.

Method 800 further comprises of providing at least one computer central processor 106 disposed in communication with the memory means 108 (step 804). Computer central processor 106 may be any type of processor, such as, but not limited to, a central processing unit (CPU), a microprocessor, a video processor, a front end processor, a coprocessor, a single-core central processor, a multi-core processor, and the like. Computer central processor 106 comprises computer executable instructions 154 which interact with the application manager 158, which also includes one or more computer-executable components for interacting with and launching the secret data app 110. The computer executable instructions 154 may be any type of computer executable instructions 154, which may be in the form of a computer program, the program being composed in any suitable programming language or source code, such as C++, C, JAVA, JavaScript, HTML, XML, and other programming languages.

Method 800 further comprises of providing a secret data app 110 readable and executable by the at least one processor's computer executable instructions 154, and configured for performing any one or more of the following: receiving an input command 160 to hide at least one content 112 of a data category 114 within a hidden directory 162 wherein the input command 160 may comprise of clicking an icon 164', touch, or applying pressure on a touch screen display, audio or text commands 160, 160' and the like; storing and hiding the at least one content 112 in the respective hidden data category 148 within the hidden directory 162, responsive to the command 160 by converting the at least one content 112 into concealed data 146, unavailable for display on the displaying means 142 unless an alternate command 160' is received and user's identity authentication information 150 is verified; displaying all content 112, 112' for the respective data category 114 while excluding the concealed data 146 for the respective data category 114 from the display 166; revealing the concealed data 146 when the display area 168 substantially adjacent to a corresponding icon 164' for the data category 114 is engaged on the display 166 and the user's authentication information 150 is verified by any one or more of the following: login id 172 or password 174 (step 206).

The at least one content 112, once converted to concealed data 146 is stored and catalogued in a similar data category 114' within a hidden directory 162 that corresponds to the at least one content 112. In this manner, for example, a video 128 that has been selected for concealment is converted to a concealed data 146 and will be stored and catalogued in a data category 114' of videos 128, 128' within the hidden directory 162. The hidden directory 162 is available for receiving editing commands 202' to effectuate edits to the concealed data 206 including but not limited to other appropriate commands 202' for the type of media of which the concealed data 206 comprises.

Secret data app 110 is a software application comprising of computer executable instructions 154', readable and executable by the central computer processor 106 and may comprise in part of a browser, such as for use on the mobile communication device 102, or a similar browsing device. Secret data app 110 may be any type of software application, such as a standalone application designed to run on a mobile platform, such as a mobile communication device running an operating system, such as iOS™, Android™, Windows Mobile™, Blackberry™, and the like. Secret data app 110 may be operative for an iPhone, any other "smart phone", mobile communication device, cellular phone, PDA, GPS or any other mobile communication device 102 capable of handling transactions dealing with dynamic content, object, application, or software. In another embodiment, the app 110 may be designed to run on a social network platform, such as FACEBOOK™ or JUSTSYNC™. In some embodiments, secret data app 110 may reside on a server and/or on a mobile communication device 102 or client device 102', where the server computer 176 may have a software program residing in memory.

In some embodiments, method 800 further comprises of the secret data app 110 being configured for receiving user's authentication information 150, wherein user authentication information 150 includes any one or more of the following: login id, password or a biometric identifier 174 (not shown) to the extent the mobile communication device supports biometric verification technology. Once the user is authenticated, secret data app 110 can display all content 112 for the respective data category 114 including the concealed data 146 on the mobile communication device's displaying means 113 by restoring the concealed data 146 from the hidden directory 162 by reconverting the concealed data 146 to the at least one content 112 making it available for display on the mobile communication's displaying means 142.

User has the option to encrypt the content 112 as opposed to hiding the content 112 using the secret data app 110, which may encrypt either the at least one content 112 or the data category 114 as per the user's selection. If the user opts to encrypt the at least one content 112 or the data category 114, the encrypted at least one content 112 is stored with the non-encrypted content 112 within the data category 114. Similarly, if user chooses to encrypt the data category 114, the encrypted data category 114 is stored with other non-encrypted data category 114.

Figure 9:
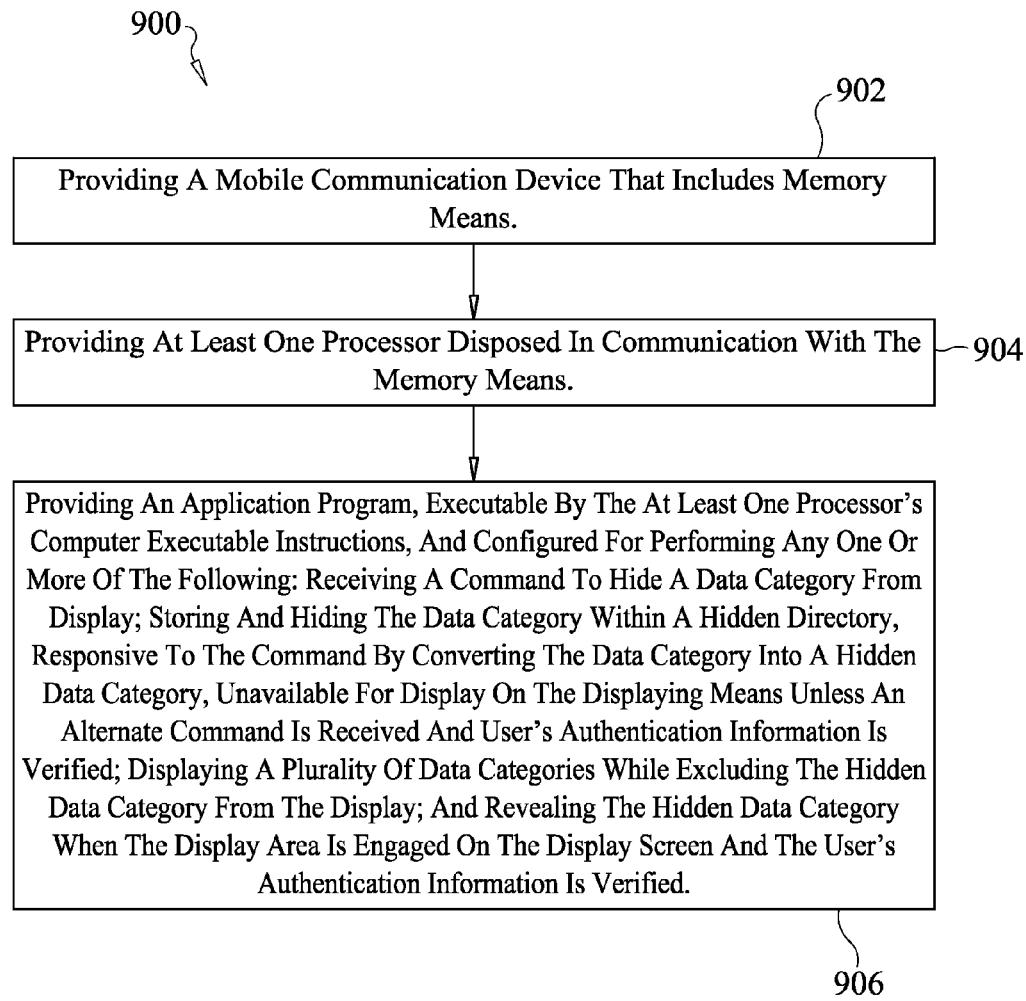
FIG. 9 is exemplary method according to one embodiment of the invention.

FIG. 9 is exemplary method 900 according to one embodiment of the invention. Method 900 comprises of providing a mobile communication device 102 that includes memory means 108 (step 902) and providing at least one processor 106 disposed in communication with the memory means 108 (step 904).

Method 900 also comprises of providing a secret data app 110, stored in the memory means 108, wherein the secret data app 110 comprise computer executable instructions 154', readable and executable by the at least one processor's computer executable instructions 154, and configured for performing any one or more of the following: receiving a command 160 to hide a data category 114 from the display 166; storing and hiding the data category 114 responsive to the command 160 by converting the data category 114 into a hidden data category 148, unavailable for display on the displaying means 142 unless an alternate command 160' is received and user's authentication information 150 is verified; displaying a plurality of data categories 122, 122' while excluding the hidden data category 148 from the display 166; and revealing the hidden data category 148 when the display area 168 is engaged on the display screen 170 and the user's authentication information 150 is verified (step 906).

In order to access the concealed data 146 or the hidden data category 148 in the hidden directory 162, user's identity has to be verified. Once verified, user can perform full editing function using appropriate commands for the type of media of which the concealed data 146 or hidden data category 148 comprises. Method 900 further comprises receiving editing commands 160', 160" within a hidden directory 162 to effectuate edits to the concealed data 146 or the hidden data category 148. As such, once verified, user may choose to reveal the concealed data 146 or the hidden data category 148 on the display 166. Method 900 comprises of restoring the hidden data category 148 from the hidden directory 162 to data category 114 available for display by reconverting the hidden data category 148 back to the displayable data category 114 making it available for display.

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
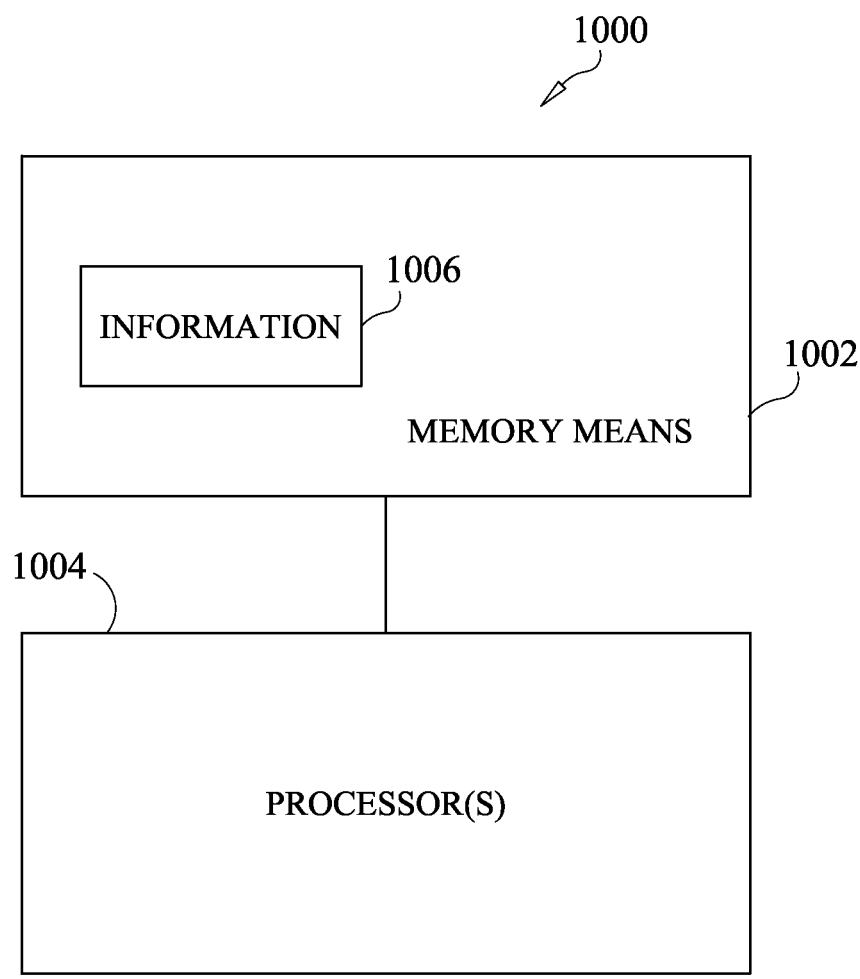
FIG. 10 is a block diagram representing an apparatus according to various embodiments.

FIG. 10 is a block diagram representing an apparatus 1000 according to various embodiments. Such embodiments may comprise a computer, a memory system, a magnetic or optical disk, some other storage device, or any type of electronic device or system. The apparatus 1000 may include one or more processor(s) 1004 coupled to a machine-accessible medium such as a memory 1002 (e.g., a memory including electrical, optical, or electromagnetic elements). The medium may contain associated information 1004 (e.g., computer program instructions, data, or both) which, when accessed, results in a machine (e.g., the processor(s) 1004) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
a mobile communication device that includes memory means;
at least one processor disposed in communication with the memory means; and
an application program executable by the at least one processor's computer executable instructions, and configured for performing any one or more of the following:
receiving a command for selective launch of the application program;
receiving a user selected command to hide at least one content of a data category within a hidden directory;
storing and hiding the at least one content within the hidden directory responsive to the command by converting the at least one content into concealed data, wherein the concealed data and the hidden directory are wholly unavailable for display anywhere on the displaying means;
displaying all content for the data category while excluding the concealed data for the data category from the display;
making available for display the concealed data upon receiving an alternate command and verifiable user's authentication information; and
revealing the concealed data when the display area substantially adjacent to a corresponding icon for the data category is engaged on the display screen and the user's authentication information is verified.

2. The system of claim 1, wherein the data category comprises of any one or more of the following: folders, documents, videos, pictures, SMS texts, contact listings, music downloads, third party applications, games, emails, calendars, notes, downloaded data or call logs.

3. The system of claim 1, wherein user authentication information includes any one or more of the following: login id, password or biometric identifier.

4. The system of claim 1, wherein the application program is further configured for displaying all content for the data category including the concealed data on the displaying means.

5. The system of claim 1, wherein the application program is further configured for encrypting any one or more of the following: at least one content or the data category.

6. The system of claim 1, wherein the application program is further configured for storing encrypted at least one content with non-encrypted content within the data category.

7. The system of claim 1, wherein the application program is further configured for storing and cataloguing concealed data within a hidden directory in a hidden data category that would otherwise correspond to the at least one content.

8. The system of claim 1, wherein the application program is further configured for receiving editing commands within the hidden directory to effectuate edits to the concealed data.

9. The system of claim 1, wherein the application program is further configured for restoring the concealed data from the hidden directory by reconverting the concealed data to the at least one content making it available for display.

10. The system of claim 1, wherein the application program is further configured for denying access to an unauthorized user to the concealed data.

11. The system of claim 1, wherein the application program is further configured for authenticating the user as being authorized to receive display of the concealed data.

12. A system comprising of:
a mobile communication device that includes memory means;
at least one processor disposed in communication with the memory means; and
an application program, stored in the memory means executable by the at least one processor's computer executable instructions, and configured for performing any one or more of the following:
receiving a command for selective launch of the application program;
receiving a user selected command to hide a data category from display;
storing and hiding the data category within a hidden directory, responsive to the command by converting the data category into a hidden data category, wherein the hidden data category is wholly unavailable for display anywhere on the displaying means;
displaying a plurality of data categories while excluding the hidden data category from the display;
making available for display the hidden data category upon receiving an alternate command and verifiable user's authentication information; and
revealing the hidden data category when the display area substantially adjacent to a corresponding icon for the data category is engaged on the display screen and the user's authentication information is verified.

13. The system of claim 12, wherein the application program is further configured for receiving editing commands within the hidden directory to effectuate edits to the concealed data or hidden data category.

14. The system of claim 12, wherein the application program is further configured for restoring the hidden data category from the hidden directory by reconverting the hidden data category to the data category making it available for display.

15. The system of claim 12, wherein the application program is further configured for denying access to an unauthorized user to the hidden data category.

16. The system of claim 12, wherein the application program is further configured for authenticating a user as being authorized to receive display of the hidden data category.

17. A method comprising of:
providing a mobile communication device that includes memory means;
providing at least one processor disposed in communication with the memory means; and
providing an application program executable by the at least one processor's computer executable instructions, and configured for performing any one or more of the following:
receiving a command for selective launch of the application program;
receiving a user selected command to hide at least one content of a data category within a hidden directory;
storing and hiding the at least one content within the hidden directory responsive to the command by converting the at least one content into concealed data, wherein the concealed data and the hidden directory are wholly unavailable for display anywhere on the displaying means;
displaying all content for the data category while excluding the concealed data for the data category from the display;
making available for display the concealed data upon receiving an alternate command and verifiable user's authentication information; and
revealing the concealed data when the display area substantially adjacent to a corresponding icon for the data category is engaged on the display screen and the user's authentication information is verified.

18. The method of claim 17, wherein the data category comprises of any one or more of the following: folders, documents, videos, pictures, SMS texts, contact listings, music downloads, third party applications, games, emails, calendars, notes, downloaded data or call logs.

19. The method of claim 17, wherein user authentication information includes any one or more of the following: login id, password or biometric identifier.

20. The method of claim 17, further comprising displaying all content for the data category including the concealed data on the displaying means.

21. The method of claim 17, further comprising encrypting any one or more of the following: at least one content or the data category.

22. The method of claim 17, further comprising storing encrypted at least one content with non-encrypted content within the data category.

23. The method of claim 17, further comprising storing and cataloguing concealed data within a hidden directory in a hidden data category that would otherwise correspond to the at least one content.

24. The method of claim 17, further comprising receiving editing commands within the hidden directory to effectuate edits to the concealed data.

25. The method of claim 17, further comprising restoring the concealed data from the hidden directory by reconverting the concealed data to the at least one content making it available for display.

26. The method of claim 17, further comprising denying access to the concealed data by an unauthorized user.

27. The method of claim 17, further comprising authenticating the user as being authorized to receive display of the concealed data.

28. A method comprising of:
providing a mobile communication device that includes memory means;
providing at least one processor disposed in communication with the memory means; and
providing an application program, executable by the at least one processor's computer executable instructions, and configured for performing any one or more of the following:

receiving a command for selective launch of the application program;

receiving a user selected command to hide a data category from display;

storing and hiding the data category within a hidden directory, responsive to the command by converting the data category into a hidden data category, wherein the hidden data category is wholly unavailable for display anywhere on the displaying means;

displaying a plurality of data categories while excluding the hidden data category from the display;

making available for display the hidden data category upon receiving an alternate command and verifiable user's authentication information; and revealing the hidden data category when the display area substantially adjacent to a corresponding icon for the data category is engaged on the display screen and the user's authentication information is verified.

29. The method of claim 28, further comprising receiving editing commands within a hidden directory to effectuate edits to concealed data or the hidden data category.

30. The method of claim 28, further comprising restoring the hidden data category from the hidden directory by reconverting the hidden data category to the data category making it available for display.

31. The method of claim 28, wherein the application program is further configured for denying access to an unauthorized user to the hidden data category.

32. The method of claim 28, wherein the application program is further configured for authenticating a user as being authorized to receive display of hidden data category.

\* \* \* \* \*